United States Patent
Al-Jarro

(10) Patent No.: US 10,402,303 B2
(45) Date of Patent: Sep. 3, 2019

(54) DETERMINING SIMILARITIES IN COMPUTER SOFTWARE CODES FOR PERFORMANCE ANALYSIS

(71) Applicant: Fujitsu Limited, Kawasaki-shi, Kanagawa (JP)

(72) Inventor: Ahmed Al-Jarro, London (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/807,000

(22) Filed: Nov. 8, 2017

(65) Prior Publication Data
US 2018/0150382 A1 May 31, 2018

(30) Foreign Application Priority Data
Nov. 25, 2016 (DE) .......................... 10 2016 223 484

(51) Int. Cl.
*G06F 9/44* (2018.01)
*G06F 11/36* (2006.01)
*G06F 11/30* (2006.01)
*G06F 11/34* (2006.01)

(52) U.S. Cl.
CPC ........ *G06F 11/3616* (2013.01); *G06F 11/302* (2013.01); *G06F 11/3428* (2013.01)

(58) Field of Classification Search
CPC . G06F 11/3616; G06F 11/302; G06F 11/3428
See application file for complete search history.

(56) References Cited

U.S. PATENT DOCUMENTS

| | | | | |
|---|---|---|---|---|
| 6,049,666 A | * | 4/2000 | Bennett | G06F 11/323 714/E11.181 |
| 2004/0221280 A1 | * | 11/2004 | Bolton | G06F 8/4435 717/151 |
| 2006/0101421 A1 | * | 5/2006 | Bodden | G06F 11/3409 717/130 |
| 2007/0073745 A1 | * | 3/2007 | Scott | G06F 17/30737 |

(Continued)

OTHER PUBLICATIONS

German Search Report dated Jul. 14, 2017 in German Patent Application No. 102016223484.6.

(Continued)

*Primary Examiner* — Adam Lee
(74) *Attorney, Agent, or Firm* — Staas & Halsey LLP

(57) ABSTRACT

Execution performance of software code is analyzed by converting values of profiling metrics, obtained by at least one software profiling tool in respect of at least one computer software code, into images using a profiling metric conversion process. The conversion process may comprise identifying a set of profiling metrics with synonymous labels within a plurality of labeled profiling metrics whose values are to be converted, using at least one natural language processing scheme, matching all profiling metrics in the set to the same label, and, for each set of profiling metrics, converting values corresponding to the profiling metrics in the set into respective images such that all the converted images have the same image format. The comparison method further comprises computing at least one of similarities and differences between at least two of the images, and comparing execution performance of the software code(s) corresponding to the two images based on the results of the computation.

10 Claims, 5 Drawing Sheets

(56) References Cited

U.S. PATENT DOCUMENTS

| | | | |
|---|---|---|---|
| 2007/0294681 A1 | 12/2007 | Tuck et al. | |
| 2011/0302100 A1* | 12/2011 | Selvakummar | G06Q 10/063112 705/321 |
| 2012/0060142 A1* | 3/2012 | Fliess | G06F 8/70 717/102 |
| 2012/0072423 A1 | 3/2012 | Morrison et al. | |
| 2013/0014096 A1* | 1/2013 | Mayo | G06F 8/62 717/170 |
| 2013/0030764 A1* | 1/2013 | Chatterjee | G06F 11/3409 702/182 |
| 2013/0111457 A1* | 5/2013 | Culter | G06F 8/65 717/171 |
| 2013/0191816 A1* | 7/2013 | Zhang | G06F 8/433 717/140 |
| 2016/0004570 A1* | 1/2016 | Koh | G06F 9/5044 718/104 |
| 2016/0358024 A1* | 12/2016 | Krishnakumar | G06K 9/00624 |
| 2017/0270024 A1* | 9/2017 | Nicol | G06F 11/3612 |
| 2018/0046497 A1* | 2/2018 | Al-Jarro | G06F 9/46 |
| 2018/0137027 A1* | 5/2018 | Breitgand | G06F 11/3624 |

OTHER PUBLICATIONS

Alex Krizhevsky et al., "ImageNet Classification with Deep Convolutional Neural Networks", 2012, 9 pages <URL: https://papers.nips.cc/paper/4824-imagenet-classification-with-deepconvolutional-neural-networks>*.

* cited by examiner

DETERMINING SIMILARITIES IN COMPUTER SOFTWARE CODES FOR PERFORMANCE ANALYSIS

CROSS-REFERENCE TO RELATED APPLICATIONS

This application claims the benefit of German Application No. 102016223484.6, filed Nov. 25, 2016, in the German Intellectual Property Office, the disclosure of which is incorporated herein by reference.

BACKGROUND

1. Field

The present embodiments relate to determining similarities in computer software codes for use in execution performance analysis.

2. Description of the Related Art

Characterising the performance of computer software codes (applications/executables), and finding similarities between their execution profiles, relies on interpreting the outcome from profilers, i.e. software profiling tools that perform a profiling process. Profiling is a form of program analysis that measures a variety of metrics that characterise software applications, with focus on run-time behaviour given a particular input. Non-exhaustive examples of such metrics are the elapsed time from the beginning to the end of the program execution, and the percentage of communication time in a distributed parallel program over its total elapse time, etc. However, the outcomes of profilers are typically not straightforward to follow, and often require deep knowledge of their functionalities. Moreover, a user needs to be fluent in understanding the metrics such profiling tools produce, which are typically presented in a text-based format, in order to be able to read, analyse and compare more than one profile outcome. As a result, a steep learning process for acquiring the knowledge needed for understanding working details of the profiling technologies is required. In addition, since the analysis of these profiling results can be laborious and time-consuming, this manual process can adversely impact users' work productivity.

Further, it is often the case that different versions of the same code (application/executable) are to be characterised. These execution versions (or benchmarks) may differ in how they are run on the possibly different computing hardware with also possibly different software settings, where different settings are applied for each benchmark before obtaining the associated profiles (code performance). As a result, different profilers may need to be used to capture the relevant metrics for these various and different execution environments/settings. It is evident that the more exhaustive the profiling process is, the higher the number of different benchmarks is required. Therefore, a plethora of text-based information is also produced. As a result, the requirements for comprehending and processing the resulting wide-ranged metrics, produced in a text-based format, are also exhaustive.

Moreover, it is typically the case that each profiler will have its own definition for representing a given computing metric. For example, each of the three definitions 'elapsed time', 'CPU time' and 'run time' can be used in three different profilers to represent the same quantity, that is 'execution time'. Therefore, obtaining a standard format for representing a particular metric and comparing its values against those produced by the other benchmarks, which may also have been produced by different profiling tools, can be tedious and very inefficient. While some of these profiling technologies have further been provisioned to provide visual interpretations (images) on codes' performance, so-called 'trace files', such images between profilers are never of a standard format. Each profiler has its own style for representing its images on the resulting trace analysis of codes' performance.

Accordingly, it is desirable to provide an effective, automated and easy-to-use mechanism for finding similarities, and/or differences, in profiling metrics for software codes (different applications/executables and/or different instances of the same application/executable), for use in analyzing execution performance.

SUMMARY

Additional aspects and/or advantages will be set forth in part in the description which follows and, in part, will be apparent from the description, or may be learned by practice of the embodiments.

According to an embodiment of a first aspect there is provided a computer-implemented profiling metric conversion process for converting values of profiling metrics, obtained by at least one software profiling tool in respect of at least one computer software code, into images for comparison purposes, which process comprises: identifying, within a plurality of labeled profiling metrics whose values are to be converted, a set of profiling metrics with synonymous labels, using at least one natural language processing scheme, and matching all profiling metrics in the set to the same label; and, for each set of profiling metrics, converting values corresponding to the profiling metrics in the set into respective images such that all the converted images have the same image format. The at least one natural language processing scheme may for example be a dictionary-based search and match scheme.

According to an embodiment of a second aspect there is provided a computer-implemented comparison method for use in analyzing execution performance of computer software code, which method comprises: converting values of profiling metrics, obtained by at least one software profiling tool in respect of at least one computer software code, into images using a profiling metric conversion process embodying the first aspect; computing at least one of similarities and differences between at least two of the images; and comparing execution performance of the computer software code(s) corresponding to the said two images based on the results of the computation.

The at least one of similarities and differences between images may be computed using an image comparison process carried out by a deep neural network trained for image recognition, which image comparison process comprises: extracting features from a first one of the images as a vector of values; and computing the similarity between the extracted vector for the first image and a vector of values representing the features of a second one of the images.

According to an embodiment of a third aspect there is provided a computer program which, when run on a computer, causes that computer to carry out a process embodying the first aspect or a method embodying the second aspect.

According to an embodiment of a fourth aspect there is provided a profiling metric conversion apparatus for converting values of profiling metrics, obtained by at least one software profiling tool in respect of at least one computer software code, into images for comparison purposes, which apparatus comprises: a matcher to identify, within a plurality of labeled profiling metrics whose values are to be converted, a set of profiling metrics with synonymous labels, using at least one natural language processing scheme, and match all profiling metrics in the set to the same label; and, a converter to convert, for each set of profiling metrics, values corresponding to the profiling metrics in the set into respective images such that all the converted images have the same image format. The at least one natural language processing scheme may for example be a dictionary-based search and match scheme.

According to an embodiment of a fifth aspect there is provided comparison apparatus for use in analyzing execution performance of computer software code, which apparatus comprises: a profiling metric conversion apparatus embodying the fourth aspect to convert values of profiling metrics, obtained by at least one software profiling tool in respect of at least one computer software code, into images; an image comparer to compute at least one of similarities and differences between at least two of the images; and a performance comparer to compare execution performance of the computer software code(s) corresponding to the said two images based on the results of the computation by the image comparer.

The image comparer may comprise a deep neural network trained for image recognition, which deep neural network: extracts features from a first one of the images as a vector of values; and computes the similarity between the extracted vector for the first image and a vector of values representing the features of a second one of the images.

An embodiment can provide an automated and easy-to-use mechanism for comparing the outcome from profiling technologies, seeking similarities in software codes and their execution performance (i.e. comparison between different applications/executables, and/or between different instances of the same application/executable), via image analysis. Similarities or anomalies between codes' performance are obtained by first converting the various text-based formats produced by profiling technologies into a unified set of metrics, then extracting values corresponding to the now-unified metrics into image representations of a standard format and analyzing the associated images in order to determine similarities, or anomalies, in codes' performance. Therefore, an automated process for comparing and diagnosing codes in a seamless and straightforward manner can be provided.

Embodiments may be beneficial to the wider high performance computing (HPC) and software programming communities, by providing a fast, reliable and cost-effective mechanism that allows users without expert knowledge in the art or prior knowledge in the metrics produced by profiler technologies to avoid dealing with the cumbersome and time-consuming processes required in prior art systems when characterizing and comparing the performance of codes (applications/executables). Embodiments can provide an automated and modular mechanism to characterize codes.

BRIEF DESCRIPTION OF THE DRAWINGS

Reference will now be made, by way of example, to the accompanying drawings, in which.

DETAILED DESCRIPTION

Figure 1:
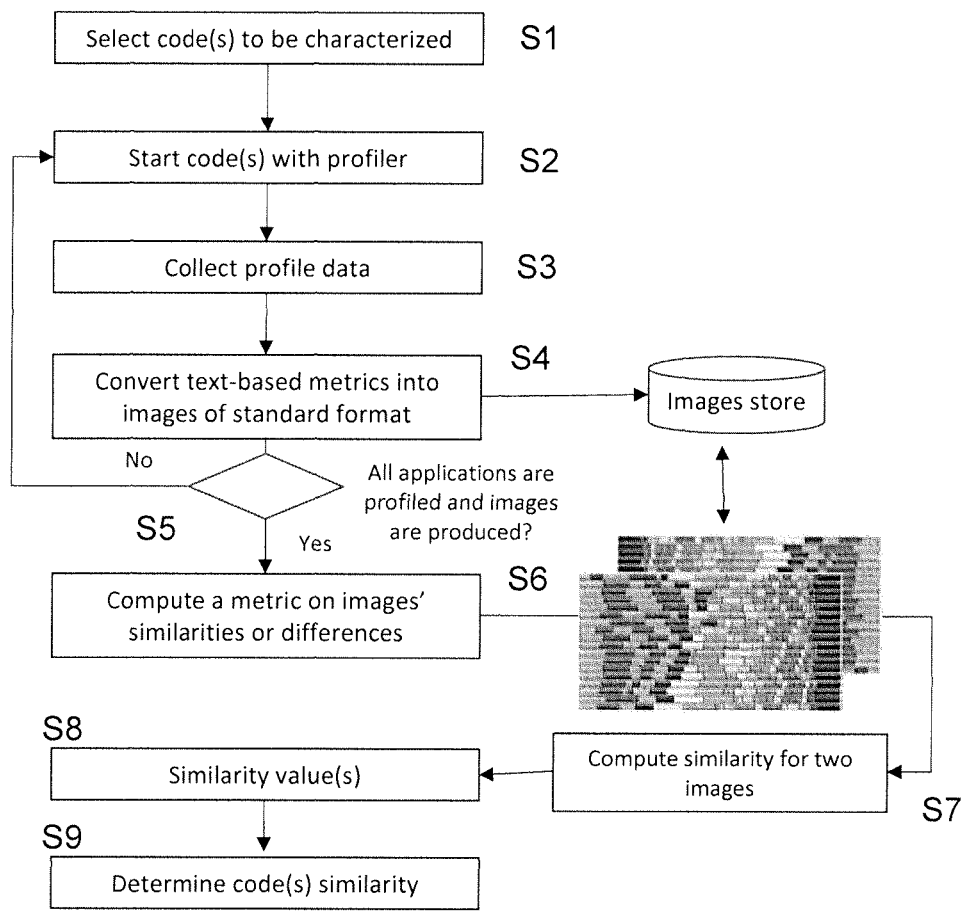
FIG. 1 is a flowchart of a method including a metric conversion process.

Reference will now be made in detail to the embodiments, examples of which are illustrated in the accompanying drawings, wherein like reference numerals refer to the like elements throughout. The embodiments are described below by referring to the figures.

An embodiment provides a method and apparatus to compute similarities, or differences, in profiling metrics for computer software codes (different applications/executables and/or different instances of the same application/executable) for use in analysis of execution performance. This may be achieved as follows:

Firstly, the definitions used for representing metrics on codes' performance are standardized Secondly, the values that correspond to the now standardized metrics are converted into images, where all images have the same format (although it is not essential to use a specific format)

Thirdly, similarities/differences between these images is determined (for example, using a deep neutral network as a feature extractor and applying the cosine similarity rule).

A flow chart that illustrates an overall method including a metric conversion process is shown in FIG. 1. In step S1, code(s) to be characterized are selected. In step S2 each code is executed whilst an accompanying profiler extracts details on the code's performance. In step S3, the extracted profile data that represent the code's performance, comprising details on its execution (commutation and communication), is collected. These details comprise, for example, information on memory usage, time complexity, usage of particular instructions, the frequency and duration of function calls, and, for the parallel execution environment, information on the frequency and duration of communication functions. In step S4, values that correspond to the collected profile data, which is retrieved from the various text-based files, is then extracted and converted into representative images of a format which is standard irrespective of the profiler used. This metric conversion step will be explained in more detail later with reference to the flowchart of FIG. 2. The image files resulting from step S4, in the now standard format, are then exported into an image store. At step S5, steps S2 to S4 are repeated until the profiling and data transformation processes are completed for all the different benchmarks. At steps S6 to S9 the process of computing image similarities is then carried out. In step S6 a metric of images' similarity or differences is computed. At step S7 the similarity between two images is determined using the computed metric. Similarity values representing the similarities between images are obtained in step S8, and the similarities/differences between the codes is determined in step S9. These steps will be explained in more detail later with reference to FIG. 3.

Figure 2:
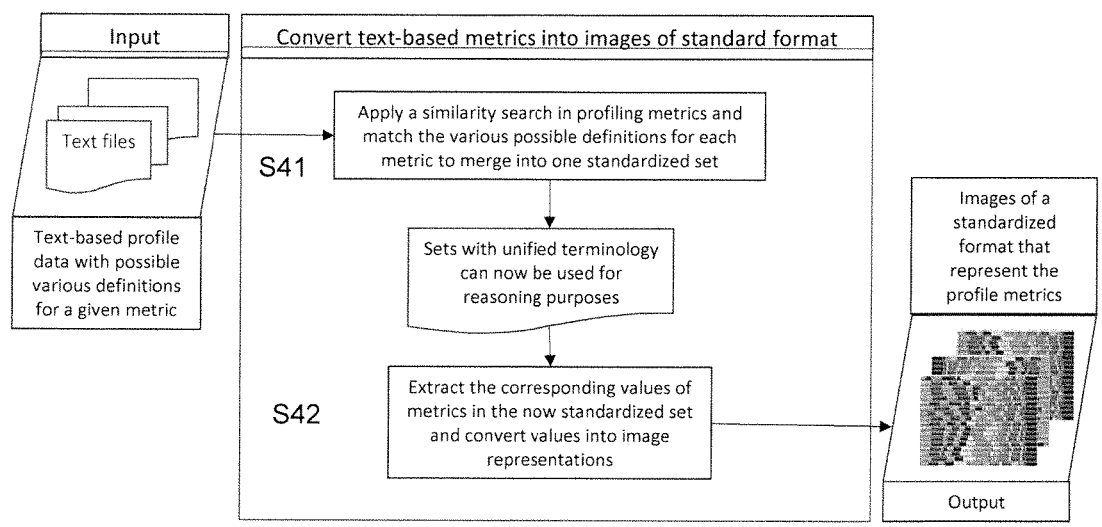
FIG. 2 is a flowchart of a metric conversion process.
Figure 3:
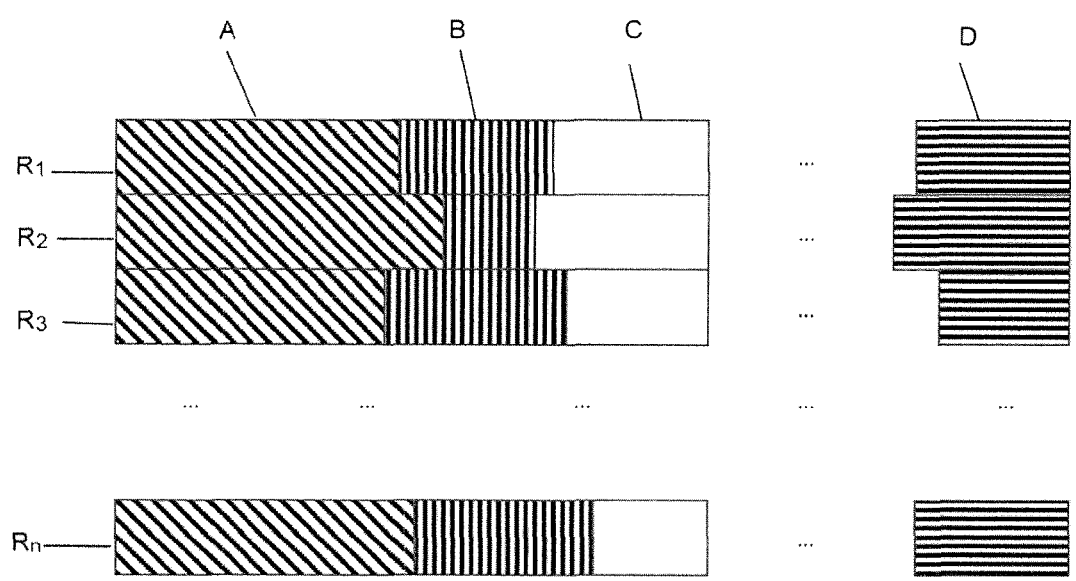
FIG. 3 is a diagram representing data values converted into images.

As aforementioned, it is typically the case that different profiling tools each have their own definition for representing each of the specific execution metrics. Therefore, in order to transform the various possible definitions representing the same quantity into a standard definition, the following metric conversion process is carried out (corresponding to step S4 of FIG. 1). Text-based search mechanisms are carried out on each set of the original 'raw' data, each produced at the profiling process, to identify the various definitions ("synonyms") for the same metrics and transform each of them into a single and consistent set of image data that represents each of the benchmarks in a standard format, as outlined in the flowchart of FIG. 2. The metric conversion process starts in step S41 by parsing the text files, whereby a natural language processing scheme is applied for converting the various possible definitions used for representing each of the metrics of the codes' performance into a unique definition. Several approaches can be applied for achieving this similarity in definitions (semantics). Nevertheless, the overall goal of this similarity matching is to merge the various synonyms into one definition. Therefore, the objective of this matching strategy is to consider similarities between the to-be-matched terms in order to create a single terminology that can be used for reasoning purposes thereafter. This can be achieved using a standard dictionary-based search and match approach on the collected data, or another suitable natural language processing scheme. In step S42, the resulting set of values that corresponds to the now matched and standardised data is converted into images using a standard conversion technique which is the same for all the data. For example, this can be achieved using the outcome from the profiling metrics conversion process, obtained from using at least one software profiling tool, whereby the elapsed time required for executing the various functions of the target programme, as well as the communication time, when run in parallel, is extracted (the communication time includes the time recorded for the communication functions on the various computing nodes and/or processes or threads run on each node). The overall extracted time values are then mapped into a representative image, for example as shown in FIG. 3. Here, the different patterns (diagonal stripes A, vertical stripes B, no stripes C, horizontal stripes D) represent the elapsed time (or percentage of elapsed time) for the different functions corresponding to execution and/or communication, when run in parallel, and each row $R_1$ to $R_n$ represents these values recorded for each computing node and/or for each invoked process or thread. Since the profiling data of the originally-various definitions have now been transformed into a standard set with unique definitions, the associated images produced to represent the values of the now unified metrics are also of standard format. The style of this image format is irrelevant (providing it is suitable for use in later processing steps); the crucial requirement is that the same image format is applied for the conversion, i.e. from values to images, of all metrics.

Wth reference to steps S6 to S9 of FIG. 1, various possible ways for computing similarities, or anomalies, between any two images exist that could be used with equal validity. In the embodiment described below deep-learning based mechanisms are used. Such mechanisms, which are well-known in the art, are extremely robust for detecting small image differences, whilst at the same time being an effective technique for capturing the importance in characteristics of the entire image.

In particular, it is known to employ deep neural networks (DNNs) as a machine learning strategy. Such DNNs are typically trained for image recognition via supervised learning and image classification. For example, one of the well-known DNNs suitable for this purpose is AlexNet see ImageNet Classification With Deep Convolutional Neural Networks, by Krizhevsky, Advances in Neural Information Processing System 25 (NIPS 2012) Specifically, AlexNet consists in inputting a stream of images, each of a fixed size of pixels, with the aim of classifying an image into one of 1000 possible categories.

Figure 4:
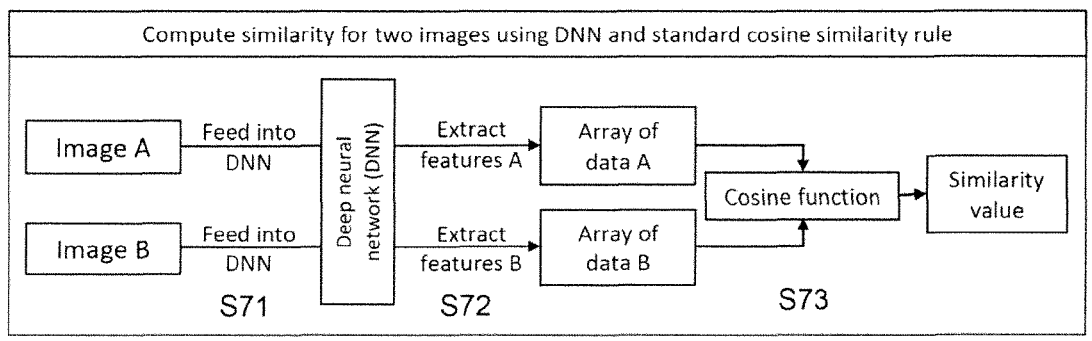
FIG. 4 is a flowchart of a similarity computation process.

Such pre-trained DNNs can be applied to extract unique features of an input image. This is done by processing the input image through the chosen DNN, stopping short however from feeding it all the way to the final layer of the DNN. Prior to reaching the network's outermost layer, corresponding features are extracted and the associated data are exported into an array of values, so-called 'vectors'. Therefore, by extracting the data associated with a given layer, the network acts as a feature extractor instead. This process is therefore capable of converting an arbitrary image, of a fixed size, into a fixed-size data array (i.e. a vector with a fixed number of real-valued elements that represent that input image). Thereafter, by comparing the similarities in the associated arrays of values for two images, for example via the standard cosine similarity function (a widely-used method for measuring the similarity between any two arrays of data (vectors)), the system can automatically detect the similarities between these two images. This process is illustrated in the diagram of FIG. 4, described below.

Firstly (step 71), two images A and B which are to be compared for similarities are input into a pre-trained DNN. For each image the data extracted from one of the final layers of the DNN is exported as an array (vector) of values which represents the features of the image (step S72). The similarity between the resulting two feature arrays (vectors) is then computed using the standard cosine distance (step S73).

Figure 5:
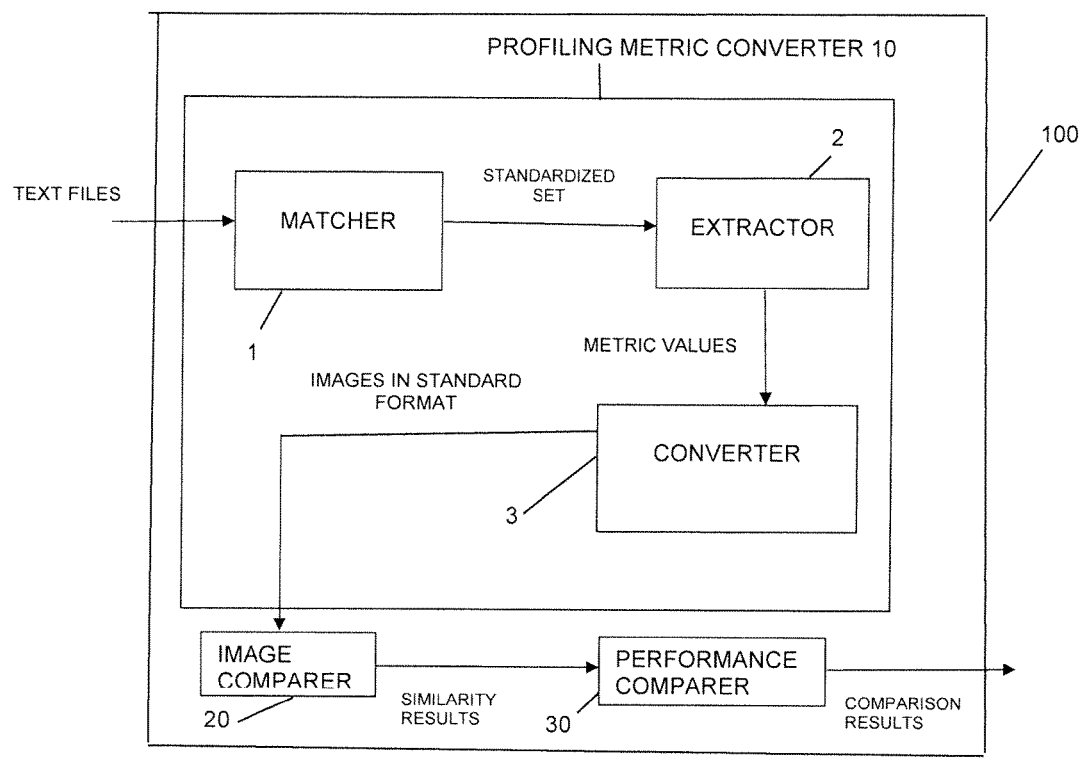
FIG. 5 is a block diagram of comparison apparatus.

FIG. 5 is a block diagram of comparison apparatus 100 configured for use in analyzing execution performance of computer software code. Apparatus 100 comprises a profiling metric conversion apparatus 10, configured to convert values of profiling metrics, obtained by one or more software profiling tools in respect of one or more computer software codes, into images, an image comparison device 20, configured to compute similarities or differences between two or more of the images, and an performance comparer 30 configured to compare execution performance of the computer software code(s) corresponding to the said two images based on the results of the computation by the image comparer 20.

The profiling metric conversion device 10 comprises a matcher 1, an extractor 2 and a converter 3. The matcher 1 is configured to identify, within a plurality of labeled profiling metrics whose values are to be converted, a set of profiling metrics with synonymous labels, using one or more natural language processing schemes (for example, a dictionary-based search and match scheme), and match all profiling metrics in the set to the same label. The extractor 2 is configured to extract values corresponding to the profiling metrics in the set, and the converter 3 is configured to convert, for each set of profiling metrics, those profiling metric values into respective images such that all the converted images have the same image format.

The image comparison device 20 may comprise a deep neural network trained for image recognition, which extracts features from a first one of the images as a vector of values, and computes the similarity between the extracted vector for the first image and a vector of values representing the features of a second one of the images.

Embodiments may be implemented in hardware, or as software modules running on one or more processors, or on a combination thereof. That is, those skilled in the art will appreciate that a microprocessor or digital signal processor (DSP) may be used in practice to implement some or all of the functionality described above.

The embodiments may also be one or more device or apparatus programs (e.g. computer programs and computer program products) for carrying out part or all of the methods described herein. Such programs may be stored on computer-readable media, or could, for example, be in the form of one or more signals. Such signals may be data signals downloadable from an Internet website, or provided on a carrier signal, or in any other form.

Figure 6:
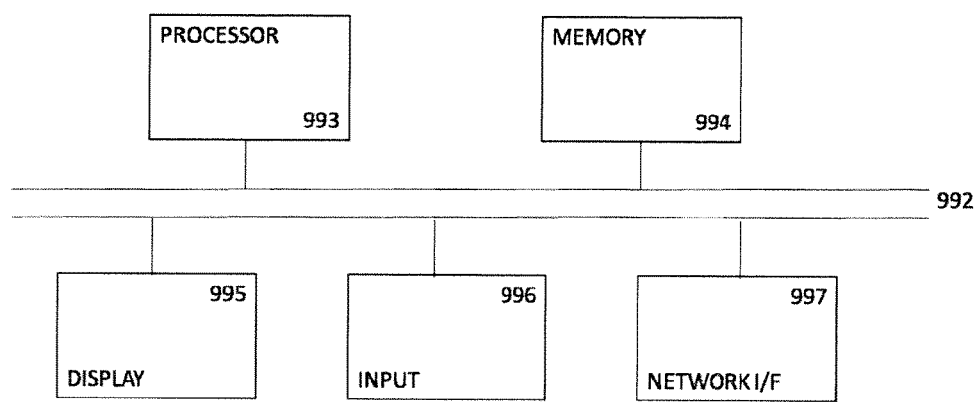
FIG. 6 is a block diagram of a computing device suitable for carrying out a method.

FIG. 6 is a block diagram of a computing device, such as a data storage server, and which may be used to implement some or all of the steps of a method, and perform some or all of the tasks of apparatus of an embodiment. For example, the computing device of FIG. 6 may be used to implement some or all of steps 51 to S9 of the method illustrated in FIG. 1, and perform some or all of the tasks of the profiling metric converter 10, the image comparer 20 and the performance comparer 30 of apparatus 100 shown in FIG. 5.

The computing device comprises a processor 993, and memory, 994. Optionally, the computing device also includes a network interface 997 for communication with other such computing devices, for example with other computing devices.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a non-transitory computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement the methods described with reference to FIGS. 1, 2, 3 and/or 4 and defined in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIVV) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 995 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network.

Other peripheral devices such as microphone, speakers, printer, power supply unit, fan, case, scanner, trackerball etc may be included in the computing device.

Methods may be carried out on a computing device such as that illustrated in FIG. 6. Such a computing device need not have every component illustrated in FIG. 6, and may be composed of a subset of those components. A method may be carried out by a single computing device in communication with one or more data storage servers via a network. The computing device may be a data storage itself storing at least a portion of the data.

A method may be carried out by a plurality of computing devices operating in cooperation with one another. One or more of the plurality of computing devices may be a data storage server storing at least a portion of the data.

The above-described embodiments may advantageously be used independently of any other of the embodiments or in any feasible combination with one or more others of the embodiments.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A computer-implemented profiling metric conversion process for converting values corresponding to profiling metrics into images for comparison purposes, the process comprising:
    obtaining the profiling metrics by at least one software profiling tool for at least one computer software code;
    identifying, within at least two labeled profiling metrics, a set of at least two profiling metrics with synonymous labels, using at least one natural language processing scheme;
    matching a plurality of the at least two labeled profiling metrics with the synonymous labels in the set to one label;
    for the set of at least two profiling metrics, converting values corresponding to the matched plurality of at least two labeled profiling metrics in the set into a set of at least two images, wherein the at least two images in the set have a same image format; and
    outputting and storing the set of at least two images to perform a comparison of the stored set of at least two images.

2. The process as claimed in claim 1, wherein the at least one natural language processing scheme is a dictionary-based search and match scheme.

3. A non-transitory computer-readable storage medium carrying instructions which, when run on a computer, causes that computer to carry out the process of claim 1.

4. A computer-implemented comparison method for use in analyzing execution performance of at least one computer software code, the method comprising:
  converting values corresponding to profiling metrics, obtained by at least one software profiling tool for the at least one computer software code, into images using a profiling metric conversion process of:
    identifying, within at least two labeled profiling metrics, a set of at least two profiling metrics with synonymous labels, using at least one natural language processing scheme;
    matching a plurality of the labeled profiling metrics with the synonymous labels in the set to one label;
    for the set of at least two profiling metrics, converting values corresponding to the matched plurality of at least two profiling metrics in the set into a set of at least two images, wherein the at least two images have a same image format;
    outputting and storing the set of at least two images;
    computing at least one of similarities and differences between at least two images in the stored set of at least two images by comparing the at least two images; and
    comparing execution performance of the at least one computer software code corresponding to the compared at least two images based on results of the computing.

5. The method as claimed in claim 4, wherein the at least one of the similarities and differences between the at least two stored images is computed using an image comparison process executed by a deep neural network trained for image recognition to:
  extract features from a first image among the at least two stored images as a vector of values; and
  compute a similarity between the extracted vector of values of the first image and a vector of values representing features of a second image among the at least two stored images.

6. A non-transitory computer-readable storage medium carrying instructions which, when run on a computer, causes that computer to carry out the method of claim 4.

7. A profiling metric conversion apparatus for converting values corresponding to profiling metrics into images for comparison purposes, the apparatus comprising:
  a memory; and
  a processor coupled to the memory and to,
    obtain, for at least one computer software code, the profiling metrics by a software profiling tool;
    implement a matcher to
      identify, within a plurality of labeled profiling metrics, a set of at least two profiling metrics with synonymous labels, using at least one natural language processing scheme, and
      match a plurality of the at least two labeled profiling metrics in the set with the synonymous labels to one label;
    implement a converter to
      convert, for the set of at least two profiling metrics, values corresponding to the matched plurality of the at least two labeled profiling metrics in the set into a set of at least two images, wherein at least two images have a same image format, and
      output and store the set of at least two images; and
    implement an image comparer to compare the stored set of at least two images.

8. The apparatus as claimed in claim 7, wherein the at least one natural language processing scheme is a dictionary-based search and match scheme.

9. A comparison apparatus for use in analyzing execution performance of at least one computer software code, the apparatus comprising:
  a memory: and
  a processor coupled to the memory and to,
    obtain, for the at least one computer software code, profiling metrics by a software profiling tool;
    identify, within a plurality of labeled profiling metrics, a set of at least two profiling metrics with synonymous labels, using at least one natural language processing scheme;
    match a plurality of the at least two labeled profiling metrics in the set with the synonymous labels to one label;
    convert, for the set of at least two profiling metrics, values corresponding to the matched plurality of the at least two labeled profiling metrics in the set into a set of at least two images, wherein at least two images have a same image format;
    compute at least one of similarities and differences between at least two images in the set of at least two images by comparing the at least two images; and
    compare execution performance of the at least one computer software code corresponding to the compared at least two images based on results of the computing.

10. The apparatus as claimed in claim 9, wherein to compute the at least one of similarities and differences between at least two images in the set of at least two images comprises using a deep neural network trained for image recognition to:
  extract features from a first image among the at least two images as a vector of values; and
  compute a similarity between the extracted vector of values of the first image and a vector of values representing features of a second image among the at least two images.

* * * * *